July 19, 1960
R. L. FRANK
2,946,004
PHASE COMPARATOR CIRCUITS
Filed Feb. 28, 1956
2 Sheets-Sheet 1
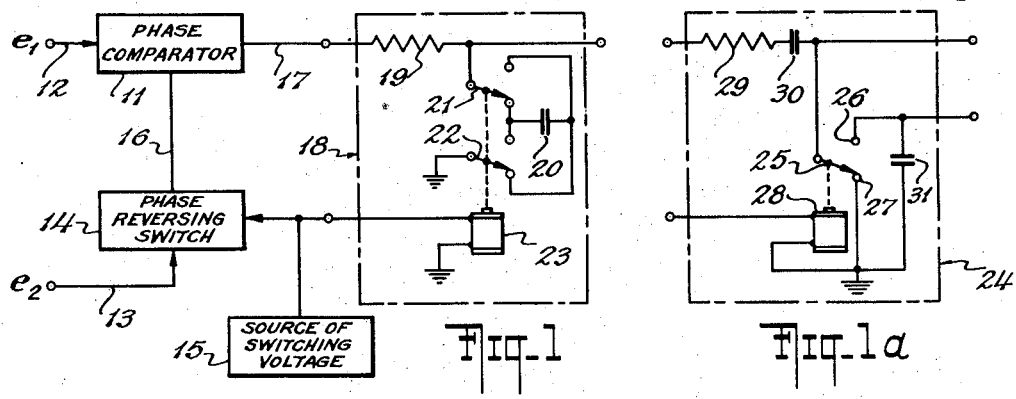
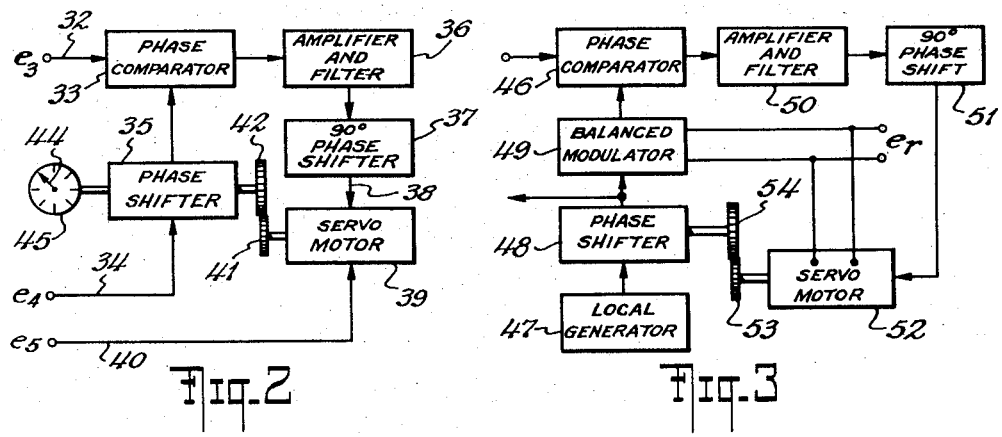
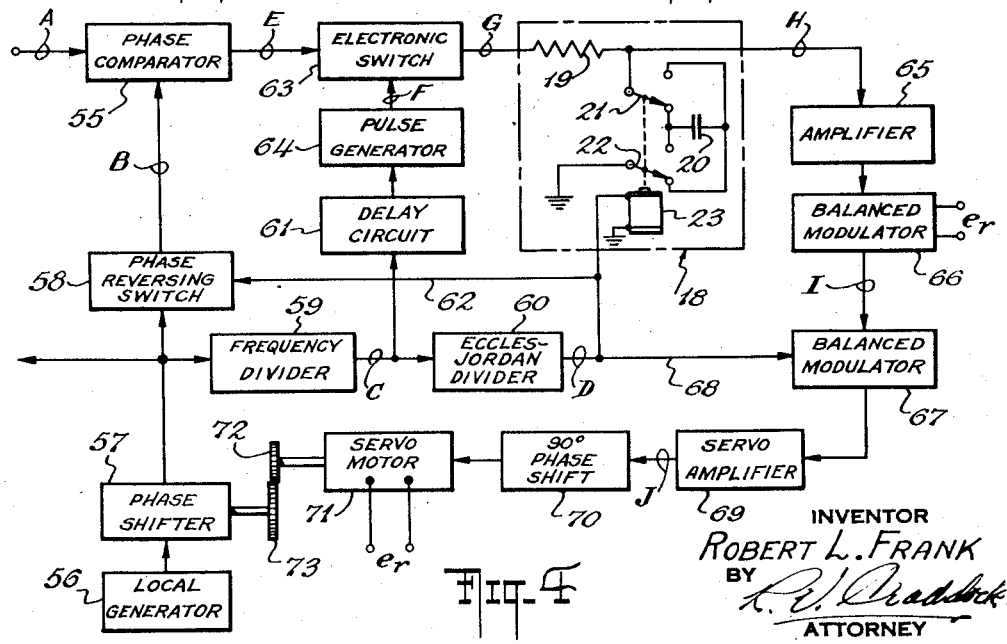
INVENTOR
ROBERT L. FRANK
BY
ATTORNEY

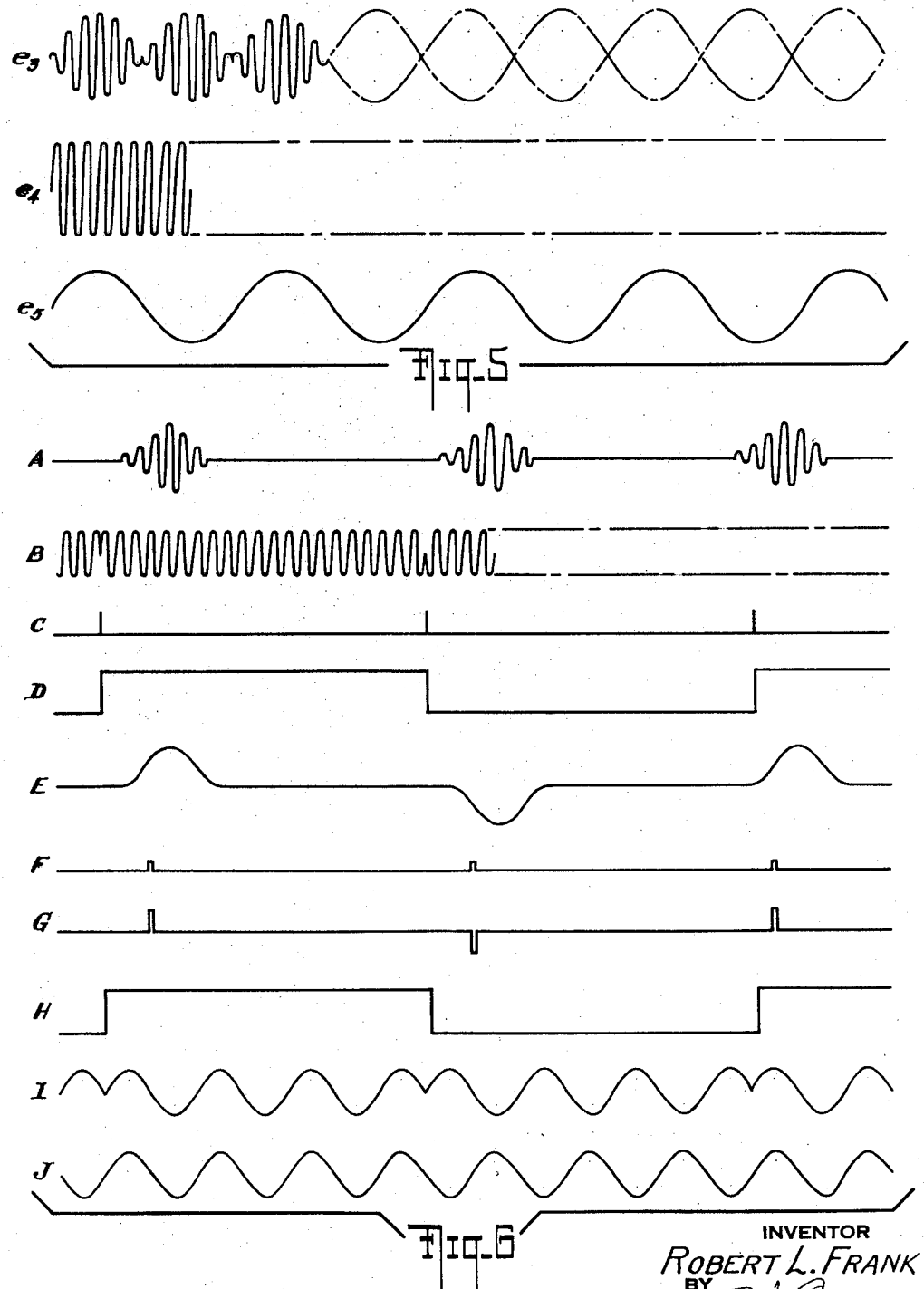

United States Patent Office 2,946,004
Patented July 19, 1960

2,946,004

PHASE COMPARATOR CIRCUITS

Robert L. Frank, Great Neck, N.Y., assignor to Sperry Rand Corporation, a corporation of Delaware Filed Feb. 28, 1956, Ser. No. 568,948

6 Claims. (Cl. 324—83)

The present invention relates to phase responsive systems, and in particular to improved phase comparator circuits.

The conventional phase comparator compares the phase between first and second alternating voltages of the same frequency to produce a direct output voltage varying in magnitude and polarity according to the relative phase difference between the applied alternating voltages. In one well known type of phase comparator the magnitude and polarity of the output voltage varies according to the cosine of the phase angle between the applied voltages. In another well known type of phase comparator the output voltage varies according to the sine of the angle between the applied voltages.

The output voltage from these prior phase comparators is adversely affected by any unbalance in the phase comparator causing an undesired unidirectional output voltage to be produced. In certain phase responsive systems it is desired that the output voltage from the phase comparator be dependent solely upon the relative phase difference between applied first and second voltages and be independent of the balance of the phase comparator. Where high accuracy of phase comparison is required the prior art type phase comparators have not been satisfactory because of the undesired unidirectional output voltage caused by unbalance in the phase comparator itself. The present invention is concerned with an improved phase comparison system in which the errors in phase measurements caused by unbalances in the phase comparator have been minimized.

Accordingly, the principal object of this invention is to provide an improved phase comparison system which is insensitive to unbalances in the phase comparator circuit.

Another object of the invention is to provide an improved phase comparator circuit which produces an alternating output voltage instead of a direct output voltage.

Yet another object of the invention is to provide an improved automatic phase control system for stabilizing the phase of the output voltage from a generator.

Still another object of the invention is to provide a phase converter for converting a first pair of alternating voltages at one frequency into a second pair of alternating voltages of lower frequency wherein the second pair of alternating voltages contains information of the relative phase difference between the first pair of alternating voltages.

In accordance with the present invention there is introduced an improved phase comparison circuit for comparing the relative phase difference between applied first and second voltages. The first alternating voltage is applied to one input circuit of a conventional phase comparator and a second alternating voltage is applied through a phase reversing switch to a second input circuit of the phase comparator. An alternating switching voltage is supplied to the phase reversing switch for alternately reversing the phase of the applied second voltage. The phase comparator produces an alternating output voltage at the frequency of the switching voltage whose magnitude varies according to the relative phase difference between the applied first and second alternating voltages. The alternating output voltage may be amplified and is applied to a phase responsive circuit to which is supplied the alternating switching voltage. The phase responsive circuit may take the form of a gated integrating circuit, another phase comparator, or a two-phase servomotor. The phase responsive circuit compares the phase between the alternating switching voltage and the alternating output voltage from the phase comparator to produce an output varying according to the relative phase difference between the applied first and second alternating voltages. This output from the phase responsive circuit may be in the form of a direct or alternating voltage if a gated integrating circuit or phase comparator is used, or the angular velocity of a shaft if a two-phase servomotor is used.

The phase comparison system of this invention may be employed to provide an improved automatic phase control system for maintaining the phase of the output voltage from a local generator stabilized with respect to the phase of an applied reference voltage. In such a system, the output voltage from the reference generator is applied through a phase reversing switch to one input of a conventional phase comparator. The phase reversing switch is activated by an applied switching voltage to periodically reverse the phase of the output voltage from the local generator as applied to one input of the phase comparator. The phase reversing voltage is compared with an applied alternating voltage coupled to another input of the phase comparator to produce an alternating output control voltage. The alternating output control voltage may be amplified and is supplied to a phase responsive circuit to which is supplied the switching voltage. The phase responsive circuit may be a two-phase servomotor which is mechanically coupled to the local generator for varying the phase of its output voltage in accordance with the alternating output control voltage. The phase of the alternating output voltage from the local generator is automatically maintained in synchronism with the phase of the applied voltage.

The above objects of and the brief introduction to the present invention will be more fully understood and further objects and advantages will become apparent from a study of the following detailed description in connection with the drawings, wherein, Fig. 1 is a block diagram of one embodiment of the improved phase comparator of this invention, Fig. 1a is a diagram of an alternative gated integrating circuit useful in the improved phase comparator of Fig. 1, Fig. 2 is a block diagram of another embodiment of the improved phase comparator of this invention, Fig. 3 is a block diagram of a simplified automatic phase control system in accordance with the present invention.

Fig. 4 is a block diagram of an automatic phase control system for synchronizing the phase of a local generator with the phase of an applied alternating voltage in accordance with the present invention.

Fig. 5 illustrates the waveforms of voltages associated with the improved phase comparator of Fig. 2, and Fig. 6 illustrates the waveforms of voltages associated with the automatic phase control system of Fig. 4.

Referring to Fig. 1, a phase comparator 11 having first and second input circuits is arranged to compare the phase difference between the first applied alternating voltage $e_1$ and the second applied alternating voltage $e_2$. The first alternating voltage is coupled over lead 12 to the first input circuit of the phase comparator. The second alternating voltage is coupled over lead 13 to the input circuit of a phase reversing switch 14. The phase reversing switch is activated by a low-frequency, square-wave switching voltage from source 15 to recurrently reverse the phase of the second alternating voltage. The phase reversing alternating voltage from the phase reversing switch is coupled over lead 16 to the second input circuit of phase comparator 11. In comparing the phase difference between the first applied alternating voltage $e_1$ and the phase reversing alternating voltage, phase comparator 11 produces an alternating output voltage whose frequency is the same as the frequency of the switching voltage from source 15 and whose amplitude and phase vary according to the relative phase difference between the first and second applied voltages $e_1$ and $e_2$.

The alternating output voltage from phase comparator 11 may be amplified, if desired, and is coupled over lead 17 to the input of a gated or switched integrating circuit 18. The integrating circuit includes resistor 19, condenser 20, and a double-pole, double-throw relay having first and second movable contacts 21 and 22, and winding 23. The alternating output voltage is coupled through the resistor 19 to movable contact 21. Movable contact 22 is coupled to ground. The square-wave switching voltage from source 15 is coupled to the winding 23 to energize the relay in synchronism with the reversals in phase of the alternating voltage from phase reversing switch 14. The frequency of the square-wave switching voltage may be appreciably less than the frequency of the first and second applied voltages whose phase difference is to be measured.

During the positive half cycles of the square-wave switching voltage, condenser 20 is coupled between movable contact 21 and movable contact 22, and during the negative half cycles of the switching voltage the connection of condenser 20 is reversed between movable contacts 21 and 22. In other words, the coupling of the integrating circuit 18 across the output circuit of phase comparator 11 reverses in synchronism with the phase reversals of the alternating voltage from phase reversing switch 14. Condenser 20 receives the same charge during the positive half cycles of the alternating output voltage from phase comparator 11 as during the negative half cycles. The voltage across condenser 20 varies in magnitude and polarity according to the relative phase difference between the first alternating voltage $e_1$ and the second alternating voltage $e_2$. The output voltage from the integrating circuit 18 is taken from movable contact 21. This output voltage periodically reverses in polarity as the relay switches from one position to the other position. The peak-to-peak magnitude of the square-wave voltage from the gated integrating circuit 18 is equal to twice the voltage across condenser 20.

The improved phase measuring system of Fig. 1 is non-responsive to any unbalance in phase comparator 11. Should there exist an undesired unidirectional voltage in the output circuit of phase comparator 11, caused by an unbalance in the phase comparator, it will be averaged to zero in the integrating circuit 18 over several cycles of the switching voltage due to the reversing coupling of the condenser 20 across the output circuit of the phase comparator. Thus, the integrating circuit 18 is non-responsive to any fixed unidirectional output voltage on lead 17.

Fig. 1a illustrates an alternative integrating circuit 24 which may be employed in Fig. 1 instead of integrating circuit 18. Integrating circuit 24 employs a single-pole, double-throw relay having a movable contact 25 and first and second fixed contacts 26 and 27. The square-wave switching voltage from source 15 is applied to the winding 28. A series coupled resistor 29 and condenser 30 is coupled between the output circuit of phase comparator 11 and the movable contact 25. A second condenser 31 is coupled across the first and second fixed contacts 26 and 27. Contact 27 is coupled to ground.

During the positive half cycles of the switching voltage, condenser 30 is charged by the output voltage from the phase comparator 11, the charging current flowing from the output circuit through resistor 29, condenser 30, and movable contact 25 to the grounded fixed terminal 27. During the negative half cycles of the switching voltage, the second condenser 31 is charged both by the output voltage from phase comparator 11 and the voltage across the terminals of condenser 30. The polarity of the output voltage from phase comparator 11 during the negative half cycles of the switching voltage is opposite to that during the positive half cycles of the switching voltage so that condenser 31 is charged to a value proportional to the sum of the voltage across condenser 30 and the voltage at the output circuit of phase comparator 11. The magnitude of the direct voltage across condenser 31 is proportional to the average of the peak-to-peak voltage at the output of phase comparator 11. The magnitude and polarity of the direct output voltage across condenser 31 varies according to the relative phase difference between the first and second alternating voltages $e_1$ and $e_2$, and is independent of any unidirectional voltage in the output circuit of phase comparator 11. This important characteristic of the integrating circuit of Fig. 1a exists because the sum of the voltage produced across condenser 30 due to any residual unidirectional voltages at the output circuit of phase comparator 11 and the residual output voltage itself is averaged to zero over several switching cycles.

A square-wave output voltage also may be obtained from movable contact 25 and this output voltage is similar to the voltage produced at the output of integrating circuit 18. The peak-to-peak magnitude of the square-wave voltage at movable contact 25 is equal to the voltage across condenser 31.

Fig. 2 illustrates a simple phase measuring system in accordance with the invention. A first alternating voltage $e_3$ whose phase is recurrently reversed, as illustrated in Fig. 5, is applied over lead 32 to the first input circuit of phase comparator 33. A second sinusoidal alternating voltage $e_4$ whose frequency is the same as the first alternating voltage $e_3$ is coupled over lead 34 and through an electro-mechanical phase shifter 35 to the second input circuit of phase comparator 33. Phase comparator 33 in comparing the phase of $e_3$ with the phase shifted version of $e_4$ produces an alternating output control voltage whose frequency is equal to the frequency of the phase reversals of the first alternating voltage $e_3$ and whose amplitude varies according to the relative phase difference between the first and second alternating voltages $e_3$ and $e_4$. This alternating output control voltage is amplified and filtered in the amplifier and filter 36 and supplied to the 90°-phase shifter 37. The amplified and phase shifted alternating control voltage is supplied over lead 38 to the first input of a two-phase servomotor 39. A sinusoidal alternating voltage $e_5$ whose frequency is equal to the frequency of the phase reversals of the first alternating voltage $e_3$ and whose phase is synchronized with the phase reversals applied over lead 49 to the second input of two-phase servomotor 39. The two-phase servomotor is energized by the alternating voltages on leads 38 and 49 to drive the electromechanical phase shifter 35 through gears 41 and 42 to vary the phase shift through the phase shifter 35 until the alternating control voltage on lead 38 is reduced to zero. The phase difference between the alternating control voltage on lead 38 and the sinusoidal voltage $e_5$ on lead 40 should be 90 degrees for optimum performance of the two-phase servomotor 39. Should there exist a phase shift through the amplifier and filter 36, the phase shift through the 90° phase shifter 37 may be adjusted to produce the desired 90 degree phase relationship between the two alternating voltages on leads 38 and 40. The shaft 43 of phase shifter 35 positions a pointer 44 to indicate on dial 45 the relative phase difference between the first alternating voltage $e_3$ and the second alternating voltage $e_4$.

The phase measuring system of Fig. 2 does not employ direct coupled circuits and is non-responsive to any unidirectional voltages that may be produced in phase comparator 33. This results in an improvement in the accuracy of phase measurements since the alternating output voltage from phase comparator 33 may be amplified in a conventional amplifier and supplied as an error control voltage to a two-phase servomotor without the need for direct coupled circuits.

Fig. 3 is a simplified block diagram of an automatic phase control system for synchronizing the phase of the output voltage from a local generator with the phase of an applied alternating voltage of the same frequency. The alternating voltage to which the output voltage from the local generator is to be synchronized is applied to the first input circuit of phase comparator 46. The sinusoidal alternating voltage from local generator 47 is coupled through an electro-mechanical phase shifter 48 to one input circuit of a balanced phase modulator or phase reversing means 49. A reference switching voltage $e_r$, which may be a 400 cycle line voltage, is supplied to the second input circuit of balanced modulator 49. The alternating output voltage from phase modulator 49 periodically reverses in phase at the frequency of the applied reference voltage $e_r$, and this output voltage is supplied to the second input circuit of phase comparator 46. Phase comparator 46 produces an alternating output voltage whose frequency is equal to the frequency of the reference switching voltage $e_r$ and whose magnitude varies according to the relative phase difference between the alternating voltages applied to the first and second input circuits of the phase comparator. The alternating output control voltage is amplified and filtered in the amplifier and filter 50 and applied through a 90° phase shifter 51 to one input circuit of the two-phase servomotor 52. The reference voltage $e_r$ is applied to a second input circuit of the two-phase servomotor 52. The servomotor 52 is energized by the two applied alternating voltages to automatically position the electro-mechanical phase shifter 48 through gears 53 and 54 so that a fixed predetermined phase relationship is maintained between the output voltage from phase shifter 48 and the applied alternating voltage to the first input circuit of phase comparator 46.

Fig. 4 illustrates a detailed block diagram of an improved phase control system for maintaining the phase of a locally generated alternating voltage stabilized with respect to the phase of an applied alternating voltage in which the improved phase comparison system of Fig. 1 has been employed. In this system a pulse-modulated alternating voltage of waveform A, as illustrated in Fig. 6, is applied to the first input of phase comparator 55. Local generator 56 produces a continuous sinusoidal alternating voltage which is coupled to an electro-mechanical phase shifter 57 where its phase may be adjusted, and the phase shifter alternating voltage from phase shifter 57 is supplied to the input of phase reversing switch 58. A phase reversing alternating voltage of waveform B is supplied from phase reversing switch 58 to the second input circuit of phase comparator 55.

The alternating voltage from phase shifter 57 is supplied to the input of frequency divider 59 which produces recurrent output pulses of waveform C whose repetition frequency equals the repetition frequency of the pulses of alternating voltage of waveform A. These recurrent output pulses are applied to the input of an Eccles-Jordan circuit 60 and to the input of delay circuit 61. The Eccles-Jordan circuit produces a square-wave switching voltage of waveform D whose frequency is one half the repetition frequency of the voltage of waveform A. The square-wave switching voltage is applied over lead 62 to phase reversing switch 58 and also to the gated or switched integrating circuit 18. The phase reversing switch 58 recurrently reverses the phase of the alternating voltage from phase shifter 57 at the frequency of the square-wave switching voltage of waveform D.

Phase comparator 55 produces output pulses of waveform E whose frequency is equal to the frequency of the switching voltage and whose magnitude and polarity vary according to the relative phase difference between the pulse-modulated voltage of waveform A and the phase reversing voltage of waveform B. These output pulses from phase comparator 55 are coupled to the input of an electronic switch 63. The electronic switch is momentarily activated by short pulses of waveform F from pulse generator 64. These short pulses are delayed with respect to the pulses of waveform C by the delay circuit 61. The electronic switch samples the magnitude of the output pulses from phase comparator 55 to produce short recurrent pulses of waveform G whose amplitude is proportional to the instantaneous magnitude of the output pulses from phase comparator 55 at the moments of occurrence of the short pulses of waveform F. In other words, the amplitude of the short recurrent pulses of waveform G varies according to the relative phase or time difference between the output pulses of waveform E from phase comparator 55 and the short sampling pulses of waveform F, the electronic switch 63 operating in a manner similar to that of a phase comparator. The output pulses of waveform G are supplied to the gated integrating circuit 18.

During the positive half cycles of the switching voltage of waveform D, the relay winding 23 is energized to connect condenser 20 across the movable contacts 21 and 22. During these positive half cycles, condenser 20 is charged to a value proportional to the positive samples of the output voltage from phase comparator 55. Similarly, during the negative half cycles of the switching voltage the relay winding 23 is unenergized and the connection of condenser 20 across the terminals 21 and 22 is reversed. During these negative half cycles, negative pulses from phase comparator 55 are coupled through resistor 19 to charge condenser 20 in the same direction as during the positive half cycles of the switching voltage. In other words, condenser 20 is charged by a current flowing through it in the same direction during each half cycle of the switching voltage. The voltage across condenser 20 is proportional to the magnitude and polarity of the output pulses from phase comparator 55 during the moments of occurrence of the short pulses of waveform F.

The output voltage from integrating circuit 18 is taken from movable contact 21, and appears as a square-wave alternating voltage of waveform H. The peak-to-peak magnitude of this square-wave output voltage is equal to twice the direct voltage across condenser 20. This square-wave output voltage is amplified by amplifier 65 and applied to one input of balanced modulator 66. An alternating reference voltager $e_r$, such as a 60 or 400 cycle line voltage, is applied to another input of balanced modulator 66. The balanced modulator 66 converts the amplified square-wave voltage of waveform H into a phase reversing alternating voltage of waveform I whose amplitude varies according to the amplitude of the amplified square-wave voltage and whose phase reverses as the phase of the square-wave voltage reverses.

The phase reversing voltage of waveform I is supplied to one input of a second balanced modulator 67. The square-wave switching voltage of waveform D is supplied over lead 68 to another input circuit of balanced modulator 67. The balanced modulator 67 converts the phase reversing reference voltage of waveform I into an alternating error control voltage whose frequency is equal to the frequency of the reference voltage $e_r$. The amplitude of the alternating error control voltage varies according to the amplitude of the amplified square-wave voltage of waveform H and whose phase reverses as the phase of the square wave from amplifier 65 reverses. This error control voltage is amplified in servo amplifier 69 and applied to the input of the 90° phase shifter 70. The error control alternating voltage from the 90° phase shifter 70, illustrated as waveform J, is in phase quadrature with the reference voltage $e_r$, and is applied to one input of a two-phase servomotor 71. The reference voltage $e_r$ is also supplied servomotor 71. The servomotor is energized by the error control voltage of waveform J to drive the electro-mechanical phase shifter 57 through gears 72 and 73 to shift the phase of the alternating voltage at the output of the phase shifter. The phase shift through phase shifter 57 is automatically controlled so as to maintain a predetermined phase difference between the applied pulse-modulated voltage of waveform A and the phase reversing alternating voltage of waveform B.

The improved automatic phase control system of Fig. 4 is insensitive to any unbalance in phase comparator 55 as well as to any unbalance in electronic switch 63. The gated integrating circuit is non-responsive to any unidirectional output voltages in the output circuit of phase comparator 55 or in the output circuit of electronic switch 63. The charge in condenser 20 due to any unidirectional voltages in the outputs of these circuits is averaged to zero over several switching cycles. Thus, the alternating voltage of waveform H varies more closely according to the relative phase difference between the two voltages of waveforms A and B whose phase difference is to be compared. The balanced modulators 66 and 67 convert the error control voltage of waveform H into an error control voltage of waveform J and this conversion is accomplished after the square-wave voltage of waveform H has been amplified by amplifier 37. The automatic phase control system of Fig. 4 does not employ direct-coupled amplifiers so that errors usually present in such circuits such as drift or residual unidirectional output voltages are not present in the improved system of this invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gated integrating circuit comprising in combination, an input terminal, a common ground terminal, and an output terminal, a relay having a movable contact and first and second stationary contacts, first condenser means coupled between said first and second stationary contacts, one of said stationary contacts being coupled directly and uninterruptedly to said common ground terminal, a resistor and second condenser coupled in series between said movable contact and said input terminal, said output terminal being coupled to one of the contacts of said relay, said second condenser being adapted for receiving a charge varying according to the average value of an applied voltage between said input terminal and said common ground terminal during first time intervals when said relay is in a first switch position and said first condenser being adapted for receiving a charge varying according to the average value of the charge in said second condenser and the average value of an applied voltage during second time intervals when said relay is in a second switch position.

2. A phase responsive system comprising a phase comparator having first and second input leads, means for applying first and second alternating voltages of the same frequency to said first and second input leads, respectively, the phase of said second alternating voltage being recurrently reversed at a rate less than the frequency of said voltages, said phase comparator having an output lead whereat an alternating voltage is produced whose polarity recurrently reverses in synchronism with the phase reversals of said second alternating voltage, an integrating circuit including input and output terminals connected together by means that include a resistor, said integrating circuit further including a ground terminal and a condenser, means for connecting said input terminal to the output lead of said phase comparator, means for connecting said condenser between said output terminal and said ground terminal, and means for breaking the connection between one side of said condenser and one of said terminals periodically during half cycles of one polarity of the alternating voltage provided by said phase comparator.

3. The combination as set forth in claim 2 that further includes means for reversing the connections of said condenser between said output terminal and said ground terminal in synchronism with the phase reversals of the second alternating voltage applied to said phase comparator.

4. The combination as set forth in claim 2 that further includes another condenser connected between said output terminal and the end of said resistor farthest from said input terminal, and means for connecting the junction between said other condenser and said output terminal alternately to said one side of said first mentioned condenser and said ground terminal in synchronism with the phase reversals of said second alternating voltage applied to said phase comparator, and means for connecting the other side of said first mentioned condenser to ground.

5. A phase responsive system comprising a phase comparator having first and second input leads, means for applying first and second alternating voltages of the same frequency to said first and second input leads, respectively, the phase of said second alternating voltage being recurrently reversed at a rate less than the frequency of said voltages, said phase comparator having an output lead whereat a voltage is produced whose polarity recurrently reverses in synchronism with the phase reversals of said second alternating voltage, an integrating circuit comprising resistance means and a condenser, means for connecting one end of said resistance means to the output lead of said phase comparator, means for periodically connecting and disconnecting the other end of said resistance means with one side of said condenser in synchronism with the phase reversals of said second alternating voltage, means for connecting the other side of said condenser to ground during the period said one side is connected to said resistance means, and means for coupling the other end of said resistance means to ground during the periods said other end is disconnected from said one side of said condenser.

6. A phase responsive system comprising a phase comparator having first and second input leads, means for applying first and second alternating voltages of the same frequency to said first and second input leads, respectively, the phase of said second alternating voltage being recurrently reversed at a rate less than the frequency of said voltages, said phase comparator having an output lead whereat a voltage is produced whose polarity recurrently reverses in synchronism with the phase reversals of said second alternating voltage, an integrating circuit including resistance means and capacitance means, means for connecting one end of said resistance means to the output lead of said phase comparator, means for connecting the other end of said resistance means alternately with one and the other sides of said capacitance means in synchronism with the phase reversals of said alternating voltage, and means for grounding the side of said capacitance means that is disconnected from said resistance means.

References Cited in the file of this patent

UNITED STATES PATENTS

| 2,114,016 | Dimond | Apr. 12, 1938 |
| 2,470,412 | Piety | May 17, 1949 |
| 2,473,542 | Philpott | June 21, 1949 |
| 2,513,528 | Sohon | July 4, 1950 |
| 2,631,279 | Bollinger | Mar. 10, 1953 |
| 2,728,907 | Grunsky | Dec. 2, 1955 |
| 2,741,756 | Stocker | Apr. 10, 1956 |